(12) United States Patent
Buchholz et al.

(10) Patent No.: US 11,425,987 B2
(45) Date of Patent: Aug. 30, 2022

(54) BRUSH HEAD, IN PARTICULAR FOR AN ELECTRICALLY DRIVEN TOOTHBRUSH, AND METHOD FOR THE PRODUCTION THEREOF

(71) Applicant: M+C Schiffer GmbH, Neustadt/Wied (DE)

(72) Inventors: Erwin Buchholz, Asbach (DE); Berthold Meyer, Neustadt/Wied (DE); Eric Schmidt, Waldbreitbach (DE)

(73) Assignee: M+C Schiffer GmbH

( * ) Notice: Subject to any disclaimer, the term of this patent is extended or adjusted under 35 U.S.C. 154(b) by 561 days.

(21) Appl. No.: 16/335,310

(22) PCT Filed: Sep. 20, 2017

(86) PCT No.: PCT/EP2017/073760
§ 371 (c)(1),
(2) Date: Mar. 21, 2019

(87) PCT Pub. No.: WO2018/054965
PCT Pub. Date: Mar. 29, 2018

(65) Prior Publication Data
US 2020/0015578 A1 Jan. 16, 2020

(30) Foreign Application Priority Data
Sep. 22, 2016 (DE) ..................... 10 2016 011 477.0

(51) Int. Cl.
*A46B 3/04* (2006.01)
*A46B 3/08* (2006.01)
(Continued)

(52) U.S. Cl.
CPC .................. *A46B 3/04* (2013.01); *A46B 3/08* (2013.01); *A46B 3/22* (2013.01); *A46D 3/005* (2013.01);
(Continued)

(58) Field of Classification Search
CPC .... A46B 3/04; A46B 3/08; A46B 3/22; A46B 9/04; A46D 3/005; B29C 45/1671; B29C 45/1676; B29L 2031/425
See application file for complete search history.

(56) References Cited

U.S. PATENT DOCUMENTS 3,196,299 A * 7/1965 Kott .................... A61C 17/3481
310/81
5,283,921 A * 2/1994 Ng ...................... A61C 17/3481
15/22.1
(Continued)

FOREIGN PATENT DOCUMENTS

DE  102005024082 A1  11/2006
DE  10 2009 009 034 A1 *  8/2010
(Continued)

*Primary Examiner* — Randall E Chin
(74) *Attorney, Agent, or Firm* — The Webb Law Firm

(57) ABSTRACT

A brush head for an electrically driven toothbrush is provided herein. The brush head includes a holding part connected to a carrier part, at least one bristle bundle formed by bristle filaments, and a resiliently soft cleaning element. The carrier part includes passage bores, through which the bristle bundle and resiliently soft cleaning element project, and each is fixed to the carrier part by way of a thickened portion formed by a filament material or a resiliently elastic material, respectively. A method of producing a brush head is also provided, including preparing the carrier part as a separate component with passage bores, fixing the bristle bundle and the resiliently elastic cleaning element to the carrier part with a thickened portion provided on the bristle bundle and the resiliently elastic cleaning element, respectively, and connecting the carrier part to the holding part.

17 Claims, 7 Drawing Sheets

(51) Int. Cl.
*A46B 3/22* (2006.01)
*A46D 3/00* (2006.01)
A46B 9/04 (2006.01)
B29C 45/16 (2006.01)
B29L 31/42 (2006.01)

(52) U.S. Cl.
CPC ......... *A46B 9/04* (2013.01); *A46B 2200/1066* (2013.01); *B29C 45/1671* (2013.01); *B29C 45/1676* (2013.01); *B29L 2031/425* (2013.01)

(56) References Cited

U.S. PATENT DOCUMENTS

| | | | |
|---|---|---|---|
| 5,689,850 A * | 11/1997 | Shekalim | A46B 13/02 |
| | | | 15/22.1 |
| 7,174,596 B2 | 2/2007 | Fischer et al. | |
| 8,166,601 B2 | 5/2012 | Brown, Jr. et al. | |
| 2010/0043165 A1 | 2/2010 | Juentgen et al. | |
| 2013/0139337 A1 | 6/2013 | Fritsch et al. | |
| 2016/0088925 A1 | 3/2016 | Pfenniger et al. | |
| 2017/0128178 A1 | 5/2017 | Schmidt et al. | |
| 2018/0153290 A1 | 6/2018 | Schmidt | |

FOREIGN PATENT DOCUMENTS

| | | |
|---|---|---|
| DE | 102009021482 A1 | 11/2010 |
| DE | 102009058608 A1 | 6/2011 |
| EP | 1 859 705 A1 * | 11/2007 |
| EP | 2599403 A1 | 6/2013 |
| EP | 1372430 B1 | 10/2014 |
| EP | 2842456 A1 | 3/2015 |
| EP | 3165126 A1 | 5/2017 |
| JP | 3131630 U | 5/2007 |
| JP | 2016152936 A | 8/2016 |
| WO | 2016097091 A1 | 6/2016 |

* cited by examiner

BRUSH HEAD, IN PARTICULAR FOR AN ELECTRICALLY DRIVEN TOOTHBRUSH, AND METHOD FOR THE PRODUCTION THEREOF

CROSS-REFERENCE TO RELATED APPLICATIONS

This application is the U.S. national phase of International Application No. PCT/EP2017/073760 filed Sep. 20, 2017, and claims priority to German Patent Application No. 10 2016 011 477.0 filed Sep. 22, 2016, the disclosures of which are hereby incorporated by reference in their entirety.

BACKGROUND OF THE INVENTION

Field of the Invention

The present invention relates to a brush head, in particular for an electrically driven toothbrush. Such a brush head is commonly sold as a component of an attachment part which can be connected to a handpiece of the electrically driven toothbrush that typically accommodates the drive therewithin. The attachment part is an expendable item made of plastic material. The attachment part usually comprises a sleeve member which is penetrated by a drive shaft that can be connected to a drive shaft of the handpiece. Disposed at the free end of the sleeve member is typically the brush head according to the present invention.

DESCRIPTION OF RELATED ART

It is generally demanded of cleaning elements for the oral cavity that they be designed very compact and in space-saving manner since the space in the oral cavity is limited, where cleaning buccal tooth surfaces is difficult anyway due to the cheek being in the immediate vicinity.

There are various options for attaching bristle bundles, which are commonly used for tooth cleaning, to a bristle carrier. The in-mold method, in which a thickened portion is formed on the bristle bundle and sealed with liquid plastic material forming the bristle carrier or at least a part thereof, allows the production of brushes which are relatively small in height. Height within the meaning of the present invention is there understood to be the extension substantially parallel to the filaments of the bristle bundles.

A brush head with the features of the preamble of claim 1 is known from EP 2 599 403. In this brush head, the holding part is connected as a pin for connecting the brush head to a drive element of the attachment part. The holding part is used first of all to impart a drive torque typically applied in a reciprocating manner with which the brush head is pivoted about its pivot axis. This holding part is connected to a plate-shaped carrier part which is attached thereto by way of in-mold technology and formed by bristle bundles that are made of bristle filaments. In the in-mold process, the bristle bundles are surface-melted at the ends to form a thickened portion. Prepared in this manner, they project through a mold cavity into which a plastic component forming the carrier part is injected. The previously known brush head also carries resiliently soft cleaning elements. They are connected on the attachment side to an attachment foot formed from plastic material, which forms a widened anchoring head that projects through a passage bore and locks therebehind in the manner of a snap lock. The anchoring head is received in a widened locking receptacle that is open on the rear side of the carrier part. This attachment of the resiliently soft cleaning element to the brush head allows for a certain pivotability of the resiliently soft cleaning element relative to the carrier part.

However, the configuration is disadvantageous because the anchoring head requires a certain height of the carrier part, which frustrates the desire for a brush that is as small in height as possible. Furthermore, bacteria or contamination can become lodged in the locking receptacle that is open on the rear side. Also, the passage of the anchoring head through the passage bore formed on the carrier part requires a certain tolerance, so that germs or contamination can collect within the passage bore and between the carrier part and the attachment foot, which opposes the hygienic requirements to be demanded of a brush head of a toothbrush.

The present invention is based on the object of providing an improved brush head, in particular for an electrically driven toothbrush, and a method suitable for the production of such brush head.

SUMMARY OF THE INVENTION

To satisfy the object in terms of the device, the present invention proposes a brush head having the features of claim 1. In this brush head, the carrier part comprises passage bores through which the bristle bundle or, respectively, the resiliently soft cleaning element projects. The brush head according to the invention comprises at least one bristle bundle and at least one resiliently soft cleaning element. Passage bores are typically provided for each of these cleaning elements. One of the bristle bundles is accordingly received in one passage bore associated with this bundle. One of the resiliently soft cleaning elements is provided in a further passage bore associated with the respective cleaning element. But it is also possible to provide a bristle bundle together with a resiliently soft cleaning element in a single passage bore. In this case, the bristle bundle and the resiliently soft cleaning element share a common passage bore.

According to the invention, the bristle bundle and the resiliently soft cleaning element are fixed in a positive-fit manner to the carrier part. This fixation is effected by way of a thickened portion which can be formed by the filament material, as is well known from the in-mold method. However, contrary to the in-mold method known per se, the carrier part is typically first prepared with passage bores and only then provided with the bristle bundle or the resiliently soft cleaning element, respectively. For the positive-fit fixation of the bristle bundle relative to the carrier part, the carrier part can first be stuffed with the bristle bundle and the bristle bundle can then be surface-melted at its end on the attachment side. A thickened portion then arises with which the bristle bundle is fixed in a positive-fit manner relative to the carrier part and applied against a rear side of the carrier part. However, the filament material can be applied in a fusible state against an opening to the corresponding passage bore and this opening can accordingly be sealed by fused bonding of the filament material to the material of the carrier part. This procedure prevents molten plastic material from entering the passage bore in the subsequent back injection molding process at the rear side of the carrier part thus prepared.

In a corresponding manner, for example, a preform of a resiliently soft cleaning element can be introduced into the passage bore and then heated at its end on the attachment side to form the thickened portion. The preform can be configured, for example, as a cylindrical rod. For example, this preform can be merely heat staked. In this method, the resiliently soft material is merely softened and then plastically shaped to form the thickened portion.

Alternatively, the carrier part can be stuffed with a prefabricated resiliently soft cleaning element. The prefabricated resiliently soft cleaning element there already has a thickened portion provided on the attachment side. The prefabricated resiliently soft cleaning element is typically pushed from the rear side of the carrier part through the passage bore until the thickened portion abuts against the rear side of the carrier part. Where the prefabricated resiliently soft cleaning element and the carrier part typically produced by injection-molding have sealing contours which engage with each other, possibly interlock, to seal the opening against the passage bore. A kind of labyrinth seal between the carrier part and the resiliently soft cleaning element in the region of the passage bore can then be formed against the respective cleaning element. Since the resiliently soft cleaning element has a high elasticity, the respective labyrinth seal can be effectively produced by pressing the cleaning element against the carrier part and the resiliently soft cleaning element can be applied against the carrier part in a sealing manner, so that the passage bore is sealed.

In one alternative method, the resiliently soft material, from which the resiliently soft cleaning element is formed, can be injected in a fusible state through the passage bore to form the resiliently soft cleaning element. This process step can take place either before or after the bristle bundle has been stuffed. For this purpose, a mold cavity is usually applied against the rear side of the carrier part and forms a suitable cavity for shaping the thickened portion. Provided on the opposite side of the carrier, that is typically prefabricated from plastic material, is a cavity which is used for molten shaping of the cleaning action region of the resiliently soft cleaning element. The latter is usually rod-shaped, i.e. cylindrical, preferably having a circular cross-section. But rectangular or polygonal or oval cross-sections are also conceivable. After injection-molding the resiliently soft material, the resiliently soft cleaning element is provided with the thickened portion and therewith joined to the carrier part at least in a positive-fit manner, preferably in a positive-fit and positive substance-fit manner.

Several resiliently soft cleaning elements can have a uniform or common thickened portion which can be produced by injection-molding, shaping or heat staking or by prefabricating several resiliently soft cleaning elements having a common thickened portion. The cleaning elements are joined to each other with this thickened portion.

Sealing the passage bore with filament material or the resiliently soft material is no necessary feature of the present invention, but nevertheless to be preferred. A carrier part provided with the resiliently soft cleaning element and the bristle bundle can be connected, for example, on the rear side directly to the holding part by way of injection-molding in order to produce a brush head that is as compact as possible in terms of height. The holding part is typically made of engineering plastic material and has a high viscosity, which makes it necessary to inject the holding part into the injection mold with relatively high pressure. The holding part can form a plate that is formed integrally on the holding part, the surface of which extends preferably substantially parallel to the surface of the carrier part. Plastic material can be introduced between the holding part and the carrier part and cure to connect the carrier part to the holding part. This plastic material can be introduced, for example, by way of injection molding. Curing in this procedure preferably takes place when the plastic melt cools down. The plastic material can just as well be an adhesive that cures or sets. If the holding part is provided with a plate, then the surface of this plate together with the rear surface of the carrier part preferably encloses a gap which is filled with the plastic material to connect the carrier part to the holding part.

In the preferred embodiment of the brush head as the brush head of an electrically driven toothbrush, a holding part comprises at least one connecting element for mechanically coupling the brush head to the electric drive of the toothbrush. The holding part comprises a pin provided thereon, preferably on one side and defining a rotational or pivot axis of the brush head. Said holding part is typically located entirely or in part within the aforementioned sleeve element of the attachment part and is received therein in such a manner that the brush head can perform a rotational or pivotal motion relative to the sleeve element but is captively coupled to the sleeve element. The connecting element for mechanically coupling the brush head to the electric drive is in the simplest case a receptacle that is recessed on the pin in which the drive shaft of the attachment part engages in order to impart, for example, a pivoting motion onto the brush head that is cyclic relative to the sleeve element. The connecting element in this case is located on the outer circumferential surface of the holding part, i.e. is in its extension perpendicular relative to the pivot axis defined by the holding part recessed in the typically cylindrical pin. At its free end, the pin typically comprises a centering bore which interacts with a centering pin of the sleeve element to define a bearing for the pivoting motion of the brush head. On the side which is typically disposed opposite the connecting element, the pin regularly has a locking recess into which a locking pin being fixedly connected to the sleeve element engages to secure the brush head within the sleeve element in such a manner that the brush head cannot be pulled out along the pivot axis from a receptacle formed on the sleeve element for the pin. The shaft provided in the sleeve element for coupling to the pin preferably comprises a substantially cylindrical locking head, the cylinder axis of which extends approximately parallel to the pivot axis of the locking pin. For receiving this locking pin, the centrical pin typically comprises a locking pin receptacle provided eccentrically relative to the pivot axis, but in parallel extension thereto.

The previously discussed elements of the pin are usually disposed within the sleeve element once the pin has been mounted on the sleeve element.

A plate which is provided as a component of the holding part projects radially over the centrical pin. The holding part is accordingly composed of the centrical pin and the plate. The plate typically has a base surface that substantially corresponds to and/or runs parallel to the base surface of the surface of the brush head through which the cleaning elements of the brush head project. This surface can be circular or oval. The base surface of the surface, i.e., the contour thereof, is selected with a convex circumferential edge to protect the tender oral mucosa from damage.

The carrier part preferably has a base surface which corresponds to the surface through which the bristle bundle projects. The preferably disk-shaped carrier part regularly forms this surface, i.e. forms the upper end of the brush head. The carrier part is preferably disk-shaped, i.e. has substantially co-planar main surfaces, where one of which usually forms the surface of the brush head and the other is provided disposed opposite to the plate and regularly in parallel extension thereto and forms an abutment surface for the thickened portions of the cleaning element. The carrier part is preferably configured as a relatively thin disk having a thickness between 0.5 and 3.0 mm. In correspondence to the position of the respective thickened portion, the plate can comprise a recess that receives the corresponding thickened portion, which is favorable for a compact design of the brush head.

The carrier part is regularly connected to the holding part such that no gap extending in the vertical direction remains between the carrier part and the plate. The carrier part can abut directly against the plate. The carrier part and the holding part are there commonly shaped as two components that are initially produced separately and subsequently joined. This joining can be effected by welding, for example, ultrasound or friction welding.

When joining by injection molding, the bristle carrier and the holding part are first inserted into an injection mold for joining the two components initially produced separately and kept at a distance to each other, so that the thickened portion of the bristle bundle and the resiliently soft cleaning element are disposed between the upper side of the holding part, preferably of the plate of the latter, and the underside of the carrier part, preferably abutting in a sealing manner against the passage bore. Plastic material is then injected into the gap remaining between the two parts and completely fills the gap, connecting the carrier part to the holding part. The intermediate layer there formed in the form of an injection-molded coating is preferably not only disposed between the carrier part and the holding part or the plate, respectively. It can also entirely or in part circumferentially surround the plate and/or the carrier part. For example, an abutting edge can thereby be produced from a different material which encloses the carrier part and the holding part circumferentially and defines the outer contour. The injected material is usually thermoplastic material. This plastic material can be resiliently soft material, for example, TPE. Alternatively, the injected material can be formed by a hard component, for example, PP, PE, PA, POM, PC or PBT. Generally preferable is easy-flowing plastic material, preferably plastic material with an MFI>15 g/10 min at 2.16 kg and a test temperature corresponding to the plastic material. It is also possible to add to the injected material an additive which has a cleaning or polishing effect so that the teeth or tissue regions within the oral cavity can be cleaned gently by the outer circumference of the brush head.

According to a further preferred embodiment of the present invention, the plastic material introduced into the intermediate space overlaps or underlaps the carrier part or the plate of the holding part, respectively. A configuration is there typically to be ensured in which the plastic material introduced into the intermediate space also transitions free of steps and continuously to a surface of the carrier part or of the holding part, respectively. The carrier part can have a radial projection or a radially circumferential edge which is provided spaced from the surface of the carrier part and is overlapped by the plastic material injected into the intermediate space in order to fix the carrier part also in a positive-fit manner relative to the holding part. Similarly, the plastic material injected into the intermediate space can also be provided on the underside of the plate. For this purpose, also the plate can form a radial projection which is underlapped by the solidified plastic material introduced into the intermediate space in order to also connect the plastic material introduced into the intermediate space in a positive-fit manner in the direction of the pivot axis to the holding part.

With regard to the strongest possible connection, it is preferable that the plastic material introduced into the intermediate space reaches up to the pin so that the plastic material introduced into the intermediate space substantially covers the rear side of the plate and forms the underside of the widened part of the brush head which projects radially to the pivot axis over the typically cylindrical pin. The plate and the carrier part can there be formed having an identical base surface, where the plastic material introduced into the intermediate space is confined to precisely this intermediate space. If the plastic material inserted into the intermediate space circumferentially surrounds the carrier part or the plate, respectively, then the outer contour of the widened part is also, inter alia, typically exclusively, defined by the plastic material introduced into the intermediate space. The plastic material introduced into the intermediate space, however, can also be disposed solely below the carrier part so that the latter alone defines the surface through which the bristle bundles project and is on the rear side covered by the plate and the plastic material that is injected into the intermediate space which can also surround the plate on the rear side in order to join the carrier part in a positive-fit manner to the holding part also in the direction of the pivot axis.

In view of the simplest possible production of the brush head according to the invention, it is proposed according to a preferred development of the present invention that the carrier part or its plate and/or the holding part, respectively, form a spacer which defines the intermediate space. The respective spacer is typically integrally formed on the carrier part or the plate, respectively. The spacer projects in the direction of the pivot axis from the carrier part or the holding part, respectively, and abuts with its free end against a mating surface which is formed by the carrier part or the plate, respectively. The spacer(s) can be provided on the carrier part as well as on the holding part in order to define the intermediate space. In the production of the brush head, the prefabricated parts, carrier part and holding part, are accordingly spaced apart in the injection mold by way of the spacers, but are already pressed against one another, which can lead to a certain deformation of the spacers. However, the intermediate space, which always remains, is filled with the plastic material introduced into the intermediate space during the injection-molded coating, so that a brush head with predetermined dimensions can be produced, not least due to the spacers.

The height of the intermediate space preferably corresponds approximately to the size of the thickened portion in order to set the height of the brush head as compact as possible. This criterion is already fulfilled where the height corresponds to 100 to 200% of the height extension of the thickened portion. The carrier part and/or the holding part are typically formed having a round or oval base surface. The oppositely disposed main side surfaces of the carrier part and the holding part are typically provided substantially flat and generally parallel to each other. Only the aforementioned spacers project beyond the oppositely disposed surfaces of the holding part and the carrier part, respectively. The surface of the carrier part, through which the bristle bundles or the resiliently soft cleaning element project, respectively, typically forms between 90 and 100%, preferably 30 to 60% of the surface of the brush head. The edge and intermediate spacings preferably occupy between 40 to 70% of the surface of the brush head. This surface of the brush head is usually formed to be circular or oval.

The clear height of a part of the brush head that is widened relative to a pin is typically between 2.5 and 5.0 mm. The pin there forms a pivot axis, possibly also drive surfaces for driving the brush head, provided the latter is installed in an electrically driven toothbrush.

According to a further preferred embodiment of the present invention, nubs are provided on the rear side of the holding part or the plate, respectively, i.e. on the side facing away from the carrier part, and are preferably integrally formed onto the holding part. The free ends of these nubs are exposed on the undersurface of the brush body. The nubs usually extend parallel to the pivot axis. The aforementioned nubs also serve to position the holding part or the plate, respectively, in an injection mold in such a manner that the plastic material introduced into the intermediate space can flow around the underside of the holding part and solidify there, so that this underside is substantially entirely formed by the plastic material introduced into the intermediate space and only the nubs are exposed with their free ends on this undersurface. A predetermined layer thickness of the plastic material introduced into the intermediate space on the underside of the brush head is thus defined in a simple manner. The spacing required for this purpose in the injection molding material is reliably and simply set by the nubs. The nubs are typically disposed radially within an outer edge of the holding part or the plate, respectively, so that the latter can be configured relatively thin at the edge and can be enclosed by the plastic material introduced into the intermediate space.

The abovementioned spacers and/or nubs are typically provided distributed in the circumferential direction on the upper surface or the undersurface of the bristle carrier and/or the holding part or the plate, respectively.

The present invention also relates to an attachment part for an electric toothbrush comprising a sleeve element, a drive shaft provided therein which can be coupled to a drive of the electric toothbrush, and a brush head according to the present invention. The brush head is there coupled to the drive shaft. The sleeve element comprises mechanical connection options at its end disposed opposite to the brush head for supporting the attachment part on the handpiece of the electric toothbrush. Furthermore, the drive shaft is configured at the end side such that the drive shaft is coupled to the drive shaft of the handpiece when the sleeve element is mounted onto the housing of the handpiece of the electric toothbrush for transmitting the rotational motion of the drive shaft to the brush head. The brush head is there typically pivoted, i.e. the drive shaft is not driven in a rotational manner but is only pivoted cyclically by a certain angular range.

BRIEF DESCRIPTION OF THE INVENTION

Further details and advantages of the present invention shall become apparent from the following description of embodiments in combination with the drawing, in which.

DESCRIPTION OF THE INVENTION

Figure 1:
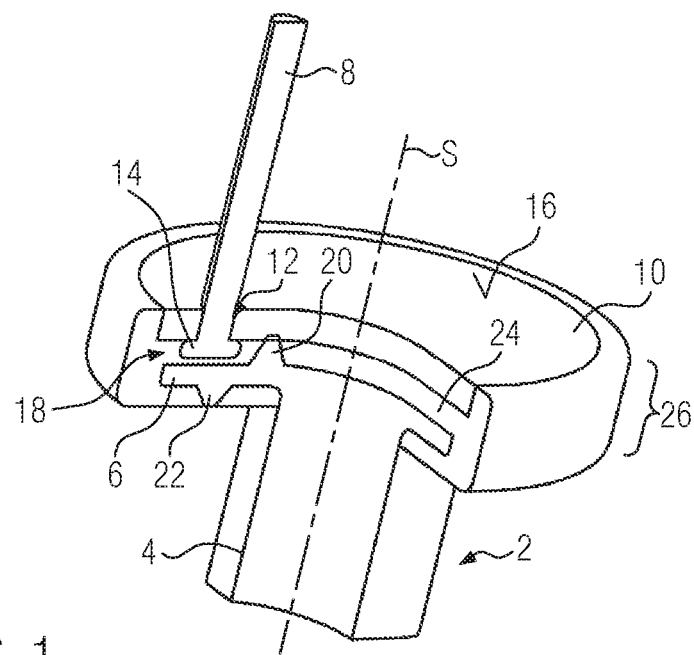
FIG. 1 is a perspective, partially sectional view of a first embodiment of the present invention.

The figures each schematically illustrated the embodiments. Reference numeral 2 denotes a holding part which forms a pin 4 and a plate 6 projecting radially therefrom and provided integrally on the pin 4. A bristle bundle 8 projects through a passage bore 12 provided in a carrier part 10 and abuts with its thickened portion 14 at the rear side of the carrier part 10 against the latter. To simplify the illustration, only one bristle bundle 8 is shown in FIG. 1. It goes without saying that the bristle bundles 8 or other cleaning elements, but especially the resiliently soft cleaning elements, project over the entire surface 16 formed by the carrier part 10 in order to obtain a cleaning action over as much surface as possible. The bristle bundles and the cleaning elements can have different diameters, colors, material properties and contours as well as different bristle filaments and a different number of bristle filaments, as is customary in the market. A cleaning element made of a thermoplastic elastomer is preferably conceivable as the resiliently soft cleaning element. The resiliently soft cleaning element preferably extends substantially parallel to the bristle bundle or bristle bundles 8.

FIGS. 1 to 5 illustrate various examples of the arrangement of the carrier part 10 relative to the holding part 2. Details of the cleaning elements held in the passage bores 12 of the carrier part 10 are discussed in FIG. 6 and the accompanying description.

Figure 6:
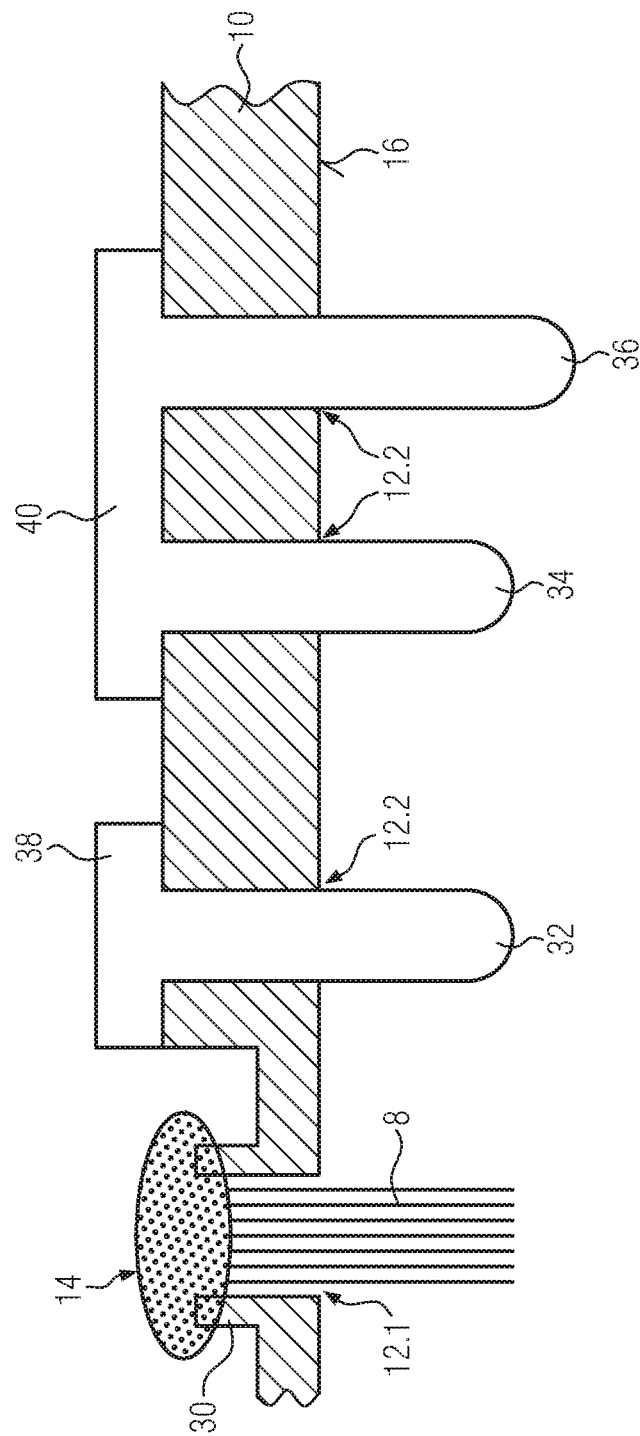
FIG. 6 is a cross-sectional view through an embodiment of a carrier part prior to being connected to the holding part.
Figure 7:
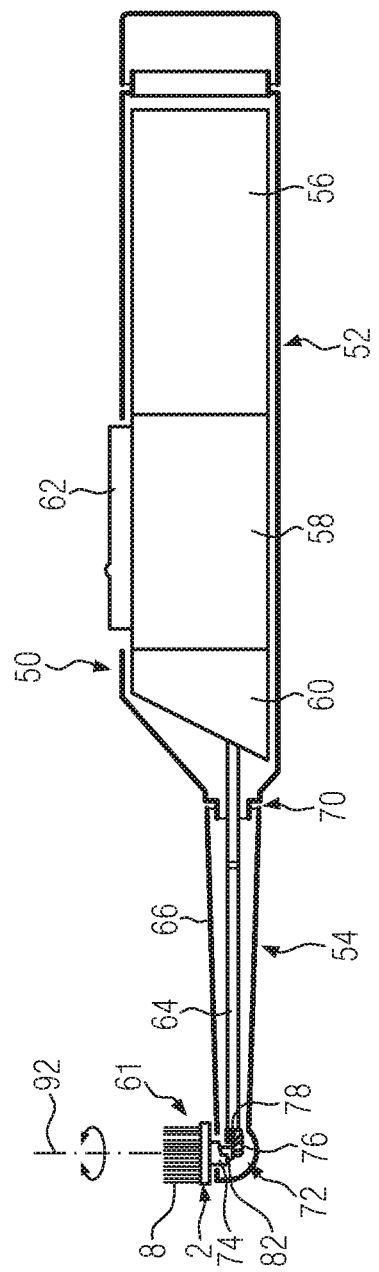
FIG. 7 is a schematic representation of an electric toothbrush.
Figure 8:
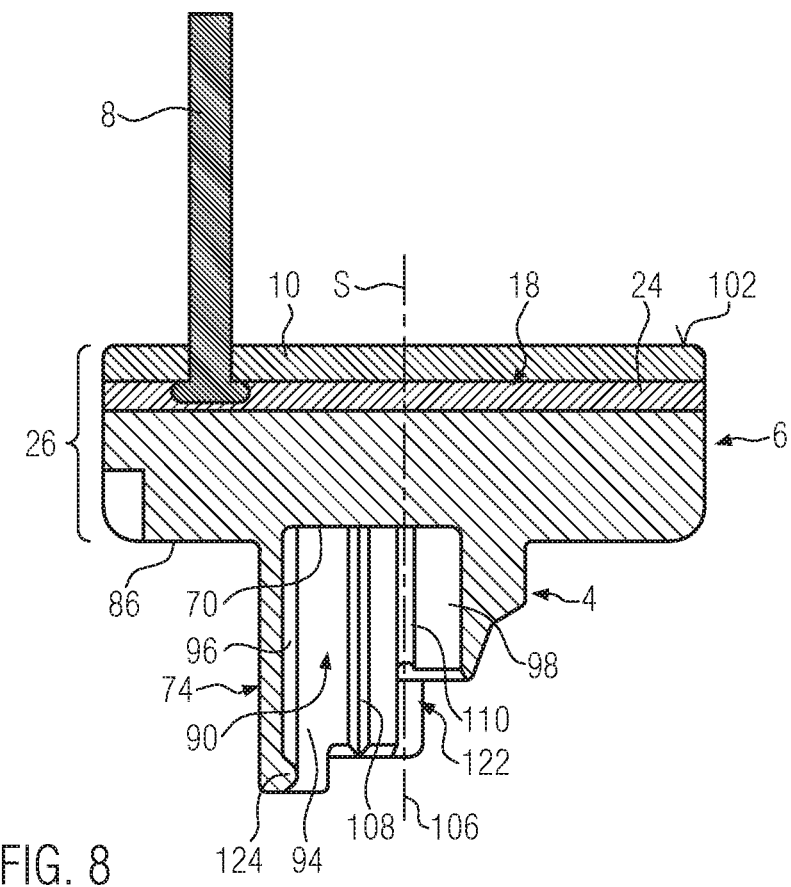
FIG. 8 is a sectional view of the brush head of the electric toothbrush according to FIG. 7.

FIG. 6 and the associated description illustrate examples of bristle bundles and resiliently soft cleaning elements and their formation.

Reference numeral 18 denotes an intermediate space enclosed between the underside of the carrier part 10 and the upper side of the plate 6. A spacer 20 projects from the plate into this intermediate space 18 and abuts against the underside of the carrier part 10 and holds the latter at a predetermined distance from the plate 6. FIG. 1 illustrates only one such spacer 20, although several such spacers 20 project from the surface of the plate 6 in order to hold and support the carrier part 10 relative to the plate 6 in a punctiform manner but at various locations.

A nub 22 projects from the underside of the plate 6. Several of these nubs 22 are also provided on the underside of the plate 6 and formed integrally thereonto.

Reference numeral 24 denotes plastic material that is injected into the intermediate space 18. It fills the intermediate space 18 entirely. The plastic material 24 also surrounds the carrier part 10 circumferentially, but ends on the surface 16 flush with the carrier part 10. The plastic material 24 also surrounds the underside of the plate 6 and projects radially up to the pin 4. A widened part of the brush head denoted with reference numeral 26 in this embodiment is formed in the manner of a disk which is composed of the carrier part 10, the plate 6 and the injection-molded coating with plastic material 24. The edges of the disk are each rounded. The plastic material 24 is presently an easily flowing thermoplastic elastomer which not only joins the carrier part 10 to the plate 6 but also forms an outer-side boundary of the disk from relatively soft material which is gentler to the tender oral mucosa than harder plastic material.

The holding part 2 is formed from engineering plastic material. The engineering plastic material exhibits high wear resistance and a high modulus of elasticity of at least 1500 MPa. The viscosity of such engineering plastic material is relatively high. The MFI of engineering plastic material of the present invention is at <20 g/10 min at the test temperature corresponding to the plastic material and a load of 2.16 kg. Technical plastic material is, in particular, POM, PA, PC, or PBT. The holding part 2 is made of such material. The pin 4 typically comprises the connections, holders and centering devices presented in the general description with which the embodiment shown can be held in a sleeve element (not shown) of an attachment part for an electric toothbrush and can be mechanically coupled to the drive.

In the embodiment shown, the plastic material 24 can impart adhesion between the carrier part 10 and holding part 2 made of the engineering plastic material. The bristle carrier can be formed from a hard component, for example, PA, PET, PP, PE, POM, PC, or PBT, respectively.

The embodiment shown in FIG. 1 assumes that a positive-fit connection is necessary for reliable attachment of the plastic material 24 to the holding part 2. The plastic material 24 also extends on the underside of the plate and accordingly forms the undersurface of the widened part 26 through which the pin 4 projects. The material nature of the carrier part 10, however, is such that the plastic material 24 can be reliably bonded to the carrier part 10 only in a positive substance-fit manner. The plastic material 24, however, surrounds the carrier part 10 solely circumferentially.

To produce the embodiment shown in FIG. 1, the carrier part 10 is first produced from plastic material by way of injection molding, where the passage bore 12 or bores are formed during injection molding. The carrier part 10 is thereafter stuffed with the bristle bundles 8, the end of which on the attachment side is initially arranged at a distance from the carrier part 10 and fused. The bristle bundle 8 is then displaced axially in order to abut the thickened portion 14 formed during the fuse process against the underside of the carrier part.

The holding part 2 is prepared by way of injection molding from engineering plastic material having the final contour with all functional surfaces on the pin. The two prepared components 2 and 10 are placed into an injection mold. The holding part 2 is there assigned to the one mold half and the carrier part 10 to the other mold half. The carrier part 10 is there typically held by a so-called perforated field plate which is typically provided with the carrier part 10 outside the injection mold and thereafter inserted thereinto for completion of the injection mold. When the injection mold is closed, the spacers 20 are abutted against the underside of the carrier part 10 and are there slightly compressed. The remaining intermediate space 18 is filled with the plastic material 24 that is then injected. The otherwise flat rear side of the plate 6 is held by the nubs 22 at a distance from the injection mold so that a gap remains there that is filled with the plastic material 24 in order to form the rear-side injection-molded coating of the plate with the plastic material 24. After the plastic material 24 has cooled down sufficiently, the mold nest is opened and the finished product shown schematically in FIG. 1 is removed.

Figure 2:
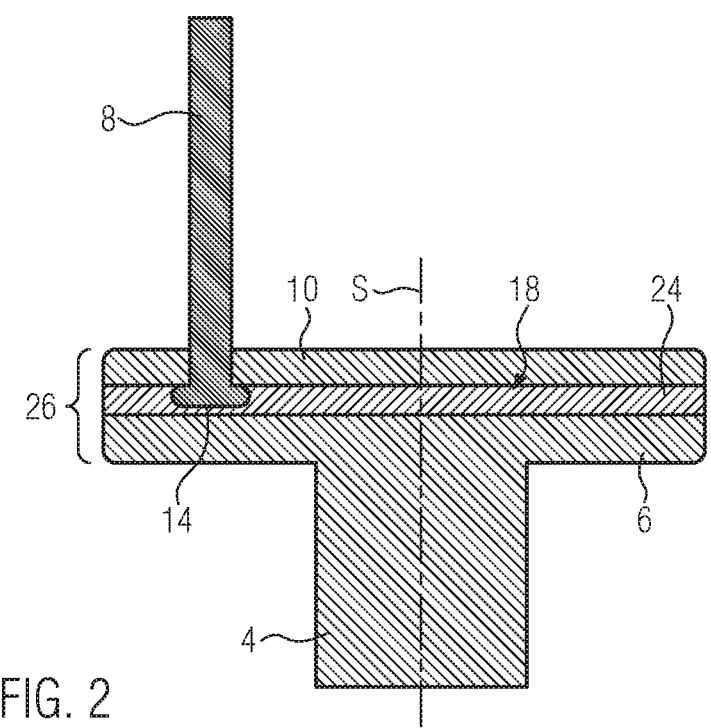
FIG. 2 is a cross-sectional view of a second embodiment.

FIG. 2 shows a cross-sectional view of a basic form of the present invention. Identical components are marked with the same reference numerals as in the previously described embodiment. This applies to all the figures of the drawing.

In the basic form according to FIG. 2, the intermediate space 18 is filled with the plastic material 24. The plastic material 24 ends flush with an outer circumferential surface of the widened part 26 which is formed at the top by the edge of the carrier part 10, at the bottom by the edge of the plate 6 and therebetween by the plastic material 24.

Figure 3:
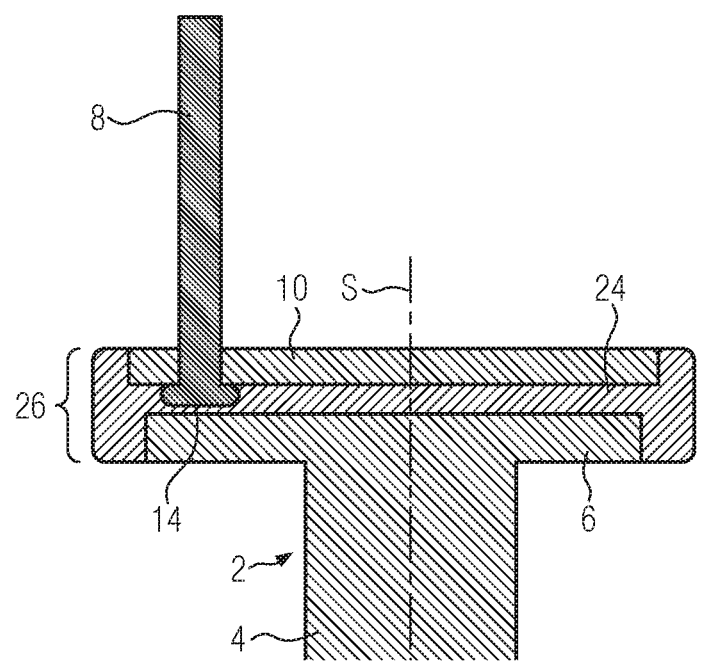
FIG. 3 is a cross-sectional view of a third embodiment.

In comparison to FIG. 2, the plate 6 in the embodiment according to FIG. 3 has a smaller radial extension than the carrier part 10. The plastic material 24 surrounds both the carrier part 10 as well as the plate 6 circumferentially but does not contribute to a higher thickness above the surface 16 or below the underside of the plate 6, respectively. The plastic material 24 is merely an impact protection which surrounds the carrier part 10 and the plate 6 circumferentially. In such a configuration, the holding part 2 and the carrier part 10 are typically formed from plastic materials which adhere to the plastic material 24 that is injected into the intermediate space 18, so that a positive substance-fit connection arises in the direction of the pivot axis S.

Figure 4:
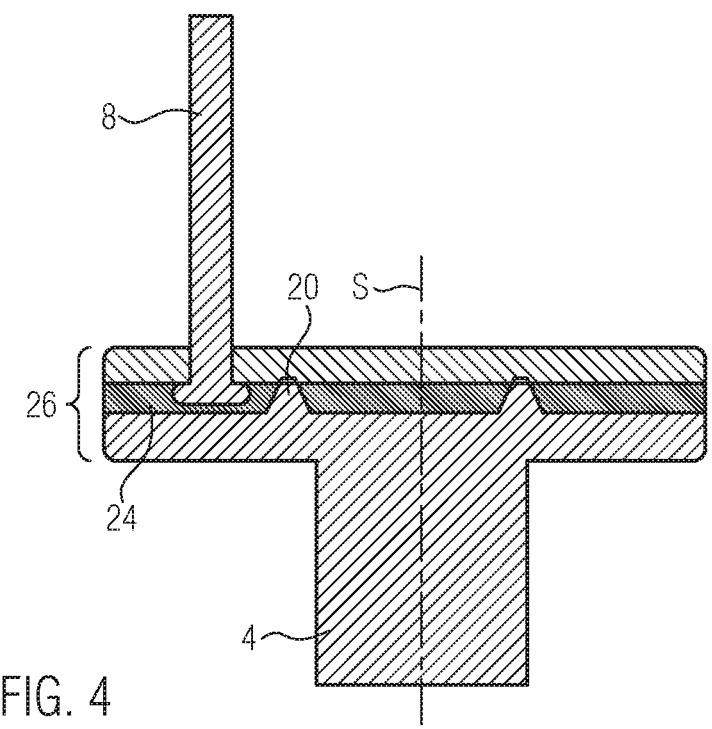
FIG. 4 is a cross-sectional view of a fourth embodiment.

The embodiment shown in FIG. 4 corresponds substantially to FIG. 2, where, however, the spacers 20 formed integrally on the holding part 2 project from the plate 6 and abut against the underside of the carrier part 10, thereby defining the intermediate space 18.

Figure 5:
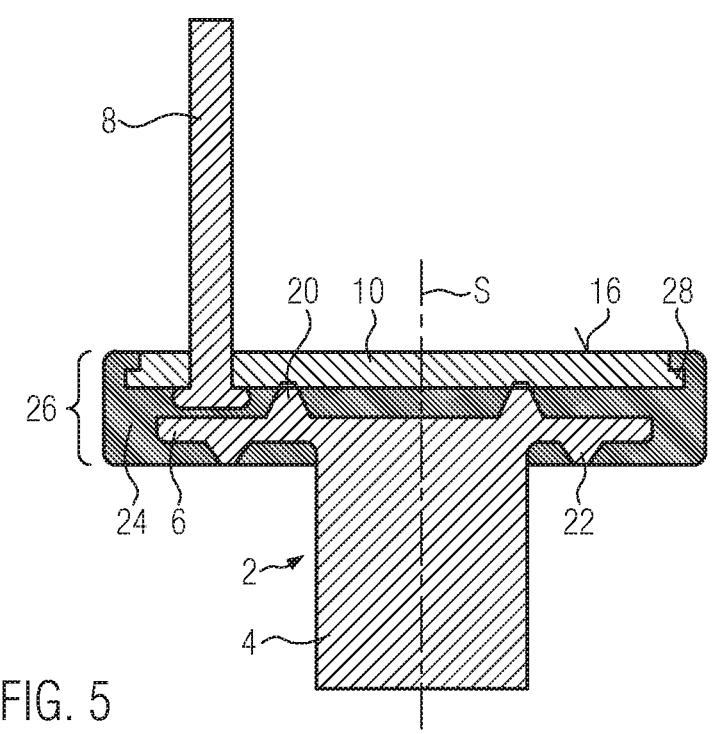
FIG. 5 is a cross-sectional view of a fifth embodiment.

The configuration shown in FIG. 5 corresponds substantially to the example according to FIG. 1. However, the carrier part 10 there has a locking edge 28 which is formed spaced from the surface 16 and projects over the surface 16 that is formed by the carrier part 10 and which is overlapped by the plastic material 24 in the direction of a pivot axis marked with reference symbol S. As a result, also the carrier part 10 is secured in a positive-fit manner against being pulled out in the direction of the pivot axis S. Due to the underside underlapping the plate 6, a correspondingly acting positive-fit connection is established between the plastic material 24 and the holding part 2. In addition, the plastic material 24 surrounds both the carrier part 10 as well as the plate 6 on the outer circumference so that a positive-fit connection is given also in a direction that is radial to the pivot axis S. The embodiment shown in FIG. 5 is particularly suitable for joining the various components when the material of the carrier part and the material of the holding part 2 are incompatible with the plastic material 24 in terms of adhesion.

FIG. 6 illustrates a cross-sectional view through an embodiment of a carrier part 10, which in the region of a first passage bore 12.1 to the bristle bundle 8 is provided on the rear side with a projecting collar 30 against which the thickened portion 14 abuts in a positive substance-fit manner. For this purpose, the filament material of the bristle bundle 8, i.e. the material forming the filaments of a single bristle bundle 8, is surface-melted at the end of the bristle bundle 8 on the attachment side and applied against the collar 30 in a fusible state, as described in WO 2016/097091 A1 originating from the present applicant.

In addition to this bristle bundle 8, various embodiments of resiliently soft cleaning elements 32, 34, 36 are illustrated. The resiliently soft cleaning elements are preferably made of a thermoplastic elastomer, i.e. a material that can be processed by injection molding. The resiliently soft material preferably has a hardness Shore A of between 20 and 60. The resiliently soft cleaning element 32 projects over the surface 16 with a cylindrical configuration and is rounded on the front side. At its oppositely disposed end, the resiliently soft cleaning element 32 has a thickened portion 38 which projects radially over the passage bore 12.2 circumferentially and is abutted against the rear side of the carrier part 10 in a sealing manner. The thickened portion 38 is shaped from the material forming the resiliently soft cleaning element 32. The resiliently soft cleaning element 32 is an example of a prefabricated resiliently soft cleaning element which is first prepared with the thickened portion 38, for example, in an injection mold and then stuffed in a pre-assembled manner by insertion into the passage bore 12.2.

The resiliently soft cleaning elements 34, 36 are provided with different lengths relative to each other and have a common thickened portion 40 which joins the two rod-shaped regions of the cleaning elements 34, 36 and thus positions the cleaning elements 34, 36 in a positive-fit manner on the rear side of the carrier part 10.

There are various possibilities for producing the embodiments of a brush head illustrated. The carrier part 10 is commonly first produced as a plastic platelet by way of injection molding. The carrier part 10 is then stuffed with bristles bundles 8 which are surface-melted on the attachment side and applied in a sealing manner against the respectively associated collar 30. Each bristle bundle 8 has a passage bore 12.1 associated with it. Prepared in this manner, the carrier part 10 can be stuffed with the resiliently soft cleaning elements which are configured as prefabricated resiliently soft cleaning elements 32 and 34, 36, respectively.

Alternatively, rod-shaped semi-finished products made of the resiliently soft material can be introduced into the respective passage bores 12. 2 and heated or surface-melted at their ends on the attachment side to form a thickened portion 38 or 40, respectively.

As a further alternative, the carrier part 10 can be inserted into an injection mold which forms cavities for forming the resiliently soft cleaning elements 32, 34, 36 with the associated thickened portions 38, 40. These cavities can be connected to one another via common flow channels within the injection molding tool. Different cavities to resiliently soft cleaning elements 32, 34, 36 can also be fluidly separated from each other in the injection mold to produce resiliently soft cleaning elements of different material properties and/or color. Injecting resiliently soft plastic material into the cavities, in particular TPE, forms the resiliently soft cleaning elements 32, 34, 36. They are fixed in a positive-fit manner relative to the carrier part 10 by way of the thickened portion 38, 40. A positive substance-fit manner connection likewise arises from the fused abutment of the resiliently soft material. Each channel 12.1, 12.2 is sealed on the rear side.

Plastic material can be injected in a further injection mold against the carrier part 10 and form the holding part 2. Alternatively, the holding part 2 can also be prepared as a separate component and plastic material connecting the holding part 2 and the carrier part 10 to each other can be introduced into the intermediate space 18 formed as a gap in order to join the two parts 2, 10.

An electrically operated toothbrush 50 consists of a handle part 52 and an attachment part 54 which can be mounted onto the handle part 52 The handle part 52 accommodates an accumulator 56 or also a battery, an electric motor 58 and a reversing device 60 which converts the continuous rotational motion of the drive shaft of the electric motor 58 into an alternating rotational motion of the brush head designated with reference numeral 61.

Disposed on the outside on handle part 52 is a switch 62 for activating the toothbrush 50. The attachment part 54 consists of a hollow support tube 66 receiving a shaft 64. The support tube 66 and the shaft 64 are connected to the handle part 52 by way of a coupling device 70, not shown. Arranged at the end of the attachment part 54 facing away from the handle part 52 is the brush head 61 which projects with its pin 4 into the hollow support tube 66.

This pin 4 forms a drive pin 74 in the manner described in more detail below and can be mounted onto a hub 82 of a bevel gear segment 76. The bevel gear segment 76 meshes with a further bevel gear segment 78 arranged at the head end of the shaft 64. The axis of rotation or axis of symmetry 92 of the brush head 61 forms an angle of about 90° with the axis of rotation of the shaft 64.

The torque of the alternatingly driven shaft 64 is transmitted to the brush head 61 by way of the bevel gearing 72 consisting of the bevel gear segments 76 and 78. The rotational angle range swept by the brush head 61 can assume values between +/−20° and +/−100°, but is preferably at a value of +/−35°.

Figure 9:
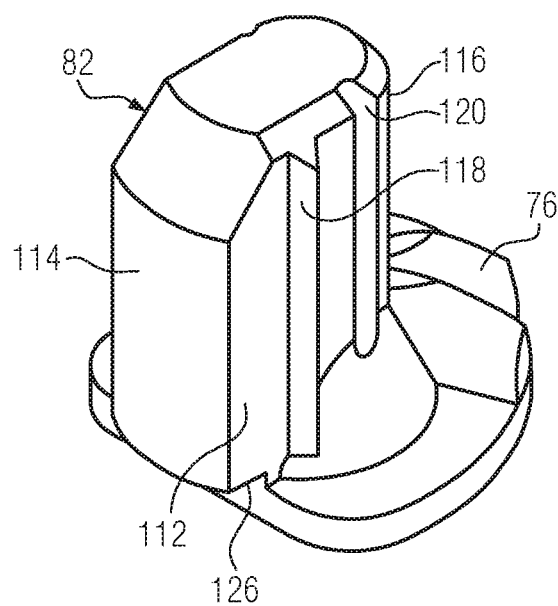
FIG. 9 is a perspective view of a drive pin of the electric toothbrush according to FIGS. 7 and 8 and FIG. 10 is a cross-sectional view of the drive pin according to FIG. 9 with the hub in the joined state.
Figure 10:
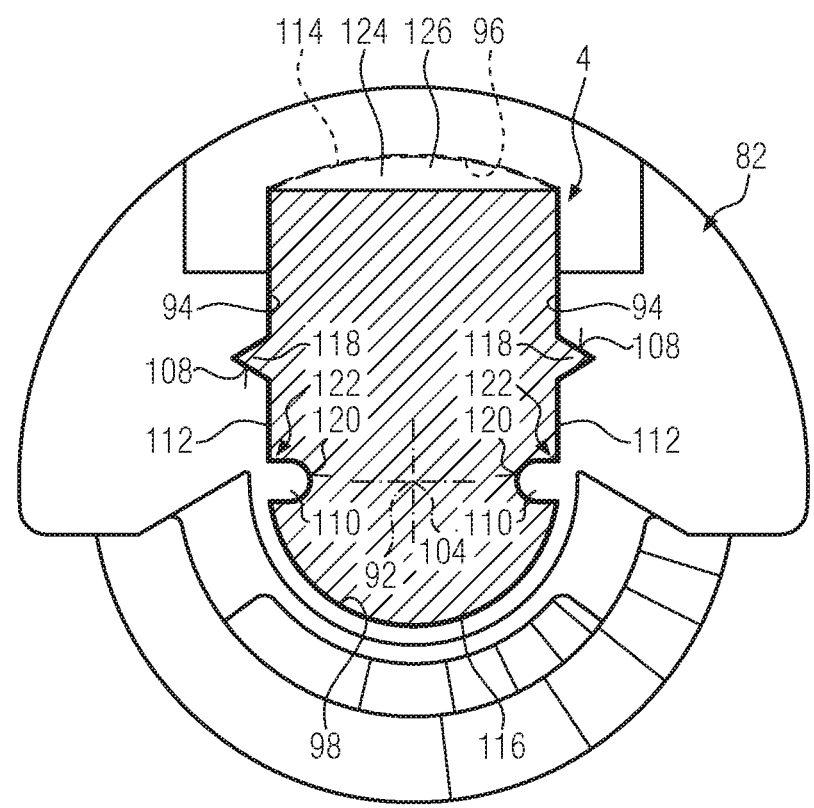

The representations of FIGS. 9 to 10 show in detail the drive pin 74 and the hub 82 or their adaptation to each other. The hub 82 is disposed on the underside 86 of the drive pin 74. The drive pin 74 is arranged and held in the hub 82 in a rotationally fixed manner. For this purpose, the hub 82 is fitted with a sleeve-shaped recess 90 which is arranged eccentrically relative to the axis of rotation or axis of symmetry 92 of the brush head 61. The recess 90 is formed by two side walls 94 arranged in parallel, to which cylindrical side wall sections 96, 98 adjoin. A base 100 defines the recess 90 in the direction of an upper side 102 of the brush head 61. The center 104 of the side wall section 98 there coincides with the axis of symmetry 106 of the brush head 61. The side walls 94 each have a groove 108 extending parallel to the axis of symmetry 106 and an adjacently disposed tongue 110. The tongue 110 or the groove 108, respectively, of each side wall 94 are arranged opposite one another.

The drive pin 74 is formed in negative image to the hub 82 and has side walls 112 extending in parallel, to which cylindrical side wall sections 114, 116 adjoin. The side walls 112 have corresponding tongues 118 and grooves 120 extending parallel to the axis of symmetry 92. The grooves 108, 120 or the tongues 110, 118, respectively, of the recess 90 or the drive pin 74, respectively, can there also be arranged in an edge region 122 in which the side wall 94 or 112, respectively, transitions to the side wall sections 96, 98 and 114, 116, respectively. The hub 82 at the edge portion facing away from the brush head comprises a snap hook 124 which overlaps a nose 126 formed on the drive pin 74.

The hub 82 and the drive pin 74 can also be produced by an injection-molded pin 4 as an integrally formed component. The pin 4 then preferably also forms the toothing of the bevel gear segment 76.

LIST OF REFERENCE NUMERALS 2 holding part
4 pin
6 plate
8 bristle bundle
10 carrier part
12 passage bore
14 thickened portion
16 surface
18 intermediate space
20 spacer
22 nub
24 plastic material injected into the intermediate space 18
26 widened portion
28 locking edge, widened portion of the brush head
S pivot axis
30 collar
32 resiliently soft cleaning element
34 resiliently soft cleaning element
36 resiliently soft cleaning element
38 thickened portion
40 thickened portion
50 toothbrush
52 handle part
54 attachment part
56 accumulator
58 electric motor
60 reversing device 61 brush head
62 switch
66 hollow support tube
64 shaft
70 coupling device
72 bevel gearing
74 drive pin
76 bevel gear segment
78 bevel gear segment
82 hub
86 lower side
90 sleeve-shaped recess
92 axis of rotation or axis of symmetry
94 side wall
96 cylindrical side wall section
98 cylindrical side wall section
100 base
102 underside
104 center point of the side wall section 98
106 axis of symmetry of the brush head 61
108 groove
110 tongue
112 side wall
114 cylindrical side wall sections
116 cylindrical side wall sections
118 tongues
120 grooves
122 edge region
124 snap hook
126 nose

The invention claimed is:

1. A brush head for an electrically driven toothbrush, the brush head comprising: a holding part connected to a carrier part, from the surface of which at least one bristle bundle formed by bristle filaments, and at least one resiliently soft cleaning element project,
wherein
the carrier part comprises passage bores, the at least one bristle bundle and the at least one resiliently soft cleaning element respectively, project through one of the passage bores and are fixed in a positive-fit manner relative to the carrier part by way of a thickened portion formed by filament material of the bristle filaments or a thickened portion formed by resiliently soft material of the resiliently soft cleaning element,
the holding part comprises a pin defining a rotational or pivot axis of the brush head and a plate which projects radially over the pin.

2. The brush head according to claim 1, wherein the thickened portion of the bristle filaments or the thickened portion of the resiliently soft cleaning element is connected in a positive substance-fit manner to the carrier part.

3. The brush head according to claim 1, wherein the thickened portion of the bristle filaments or the thickened portion of the resiliently soft cleaning element is connected to said carrier part such that an opening on a rear side to the passage bore is closed.

4. The brush head according to claim 1, wherein an opening on a rear side to the passage bore is closed by either the filament material or the resiliently soft material which is applied in a molten state against the carrier part.

5. The brush head according to claim 1, wherein the several resiliently soft cleaning elements have a common thickened portion and are thereby connected to each other.

6. The brush head according to claim 1, wherein the holding part and the carrier part are connected to each other by a plastic material introduced in a molten state into a gap between the carrier part and the holding part.

7. The brush head according to claim 6, wherein the plastic material in the gap circumferentially surrounds the carrier part and/or a plate formed by the holding part, and underlaps or overlaps the plate and/or the bristle carrier.

8. The brush head according to claim 6, wherein the carrier part and/or the holding part forms at least one spacer defining the gap.

9. The brush head according to claim 1, further comprising a connecting element configured to mechanically couple the brush head to an electric drive of the electrically driven toothbrush.

10. An attachment part for an electric toothbrush, the attachment part comprising a sleeve member, a drive shaft provided therein configured to be coupled to a drive of the electric toothbrush, and the brush head according to claim 1 which is coupled to the drive shaft.

11. A method for producing the brush head for an electrically driven toothbrush according to claim 1 comprising a holding part connected to a carrier part, from the surface of which at least one bristle bundle formed by bristle filaments, and at least one resiliently soft cleaning element project, the method comprising:
preparing the carrier part as a separate component, the carrier part comprising passage bores, at least one bristle bundle made of bristle filaments projecting through one of the passage bores and at least one resiliently soft cleaning element projecting through the passage bore or one of the other passage bores connected to the carrier part and is fixed by way of a thickened portion formed on the bristle bundle or a thickened portion of the resiliently soft cleaning element, respectively; and
connecting the carrier part to the holding part.

12. The method according to claim 11, further comprising forming the thickened portion of the bristle bund from a filament material and/or forming the thickened portion of the resiliently soft cleaning element from a resiliently soft material, wherein the thickened portion(s) are formed by applying the filament material or the resiliently soft material in a molten state against an opening on a rear side of the passage bore thereby sealing the latter.

13. The method according to claim 11, further comprising stuffing the carrier part with a prefabricated resiliently soft element.

14. The method according to claim 11, further comprising injecting a resiliently soft material through the passage bore for forming the resiliently soft cleaning element.

15. The method according to claim 11, further comprising heating an end of the at least one bristle bundle and/or a heating an end of a preform of a resiliently soft cleaning element on an attachment side after insertion into the passage bore to form the thickened portion of the bristle bundle and/or the thickened portion of the resiliently soft cleaning element.

16. The method according to claim 15, further comprising heating the at least one resiliently soft cleaning element and the at least one bristle bundle together at the attachment side to form a common thickened portion.

17. The method according to claim 11, further comprising providing the at least one resiliently soft cleaning element and the at least one bristle bundle in a single passage bore.

* * * * *

UNITED STATES PATENT AND TRADEMARK OFFICE
CERTIFICATE OF CORRECTION

PATENT NO. : 11,425,987 B2
APPLICATION NO. : 16/335310
DATED : August 30, 2022
INVENTOR(S) : Erwin Buchholz et al.

It is certified that error appears in the above-identified patent and that said Letters Patent is hereby corrected as shown below:

On the Title Page

Column 1, Assignee, Line 1, after "GmbH" insert -- , (DE) --

Column 2, Abstract, Line 12, delete "clastic" and insert -- elastic --

Signed and Sealed this
Twenty-second Day of November, 2022

Katherine Kelly Vidal
*Director of the United States Patent and Trademark Office*